United States Patent
Uehara

(10) Patent No.: US 8,416,591 B2
(45) Date of Patent: Apr. 9, 2013

(54) DC-DC CONVERTER WITH SOFT START CIRCUIT

(75) Inventor: Osamu Uehara, Chiba (JP)

(73) Assignee: Seiko Instruments Inc., Chiba (JP)

(*) Notice: Subject to any disclaimer, the term of this patent is extended or adjusted under 35 U.S.C. 154(b) by 352 days.

(21) Appl. No.: 12/883,036

(22) Filed: Sep. 15, 2010

(65) Prior Publication Data
US 2011/0062931 A1    Mar. 17, 2011

(30) Foreign Application Priority Data
Sep. 17, 2009  (JP) ................. 2009-216247

(51) Int. Cl.
H02M 1/36  (2007.01)

(52) U.S. Cl.
USPC .............. 363/49; 323/288; 323/901

(58) Field of Classification Search ........... 323/901, 323/222, 288, 238, 321; 363/49
See application file for complete search history.

(56) References Cited

U.S. PATENT DOCUMENTS

| | | | |
|---|---|---|---|
| 5,289,101 A * | 2/1994 | Furuta et al. ........... | 320/145 |
| 6,674,272 B2 * | 1/2004 | Hwang .................... | 323/284 |
| 7,009,857 B2 * | 3/2006 | Chen et al. .............. | 363/60 |
| 7,592,790 B2 * | 9/2009 | Yang ....................... | 323/277 |
| 7,675,279 B2 * | 3/2010 | Okamoto et al. ....... | 323/283 |
| 7,906,945 B2 * | 3/2011 | Kao et al. ............... | 323/238 |
| 2005/0024033 A1 | 2/2005 | Nakata | |
| 2009/0140703 A1 * | 6/2009 | Kwon ...................... | 323/222 |
| 2009/0189586 A1 * | 7/2009 | Tiew ........................ | 323/288 |

FOREIGN PATENT DOCUMENTS

JP    2005-051956 A    2/2005

* cited by examiner

*Primary Examiner* — Harry Behm
(74) *Attorney, Agent, or Firm* — Brinks Hofer Gilson & Lione

(57) ABSTRACT

Provided is a DC-DC converter including a soft start circuit capable of prolonging a soft start time without increasing a capacitance used in the soft start circuit. A soft start is implemented by gradually increasing a limiting level of an inductor current or a reference voltage. The soft start time is adjusted by varying a frequency of CLOCK signals supplied to switch circuits. The soft start time may be prolonged without increasing a chip size because the capacitance does not need to be increased to prolong the soft start time.

4 Claims, 5 Drawing Sheets

US 8,416,591 B2

DC-DC CONVERTER WITH SOFT START CIRCUIT

RELATED APPLICATIONS

This application claims priority under 35 U.S.C. §119 to Japanese Patent Application No. 2009-216247 filed on Sep. 17, 2009, the entire content of which is hereby incorporated by reference.

BACKGROUND OF THE INVENTION

1. Field of the Invention

The present invention relates to a DC-DC converter for generating a constant voltage, and more particularly, to a DC-DC converter circuit provided with a soft start function.

2. Description of the Related Art

As a conventional DC-DC converter provided with a soft start function, a configuration illustrated in FIG. 6 is known. FIG. 6 illustrates a buck DC-DC converter by way of example.

A reference voltage circuit 103 is connected to a bias circuit 134 and a drain of a transistor 132. The transistor 132 has a gate connected to a connection point between a bias circuit (constant current circuit) 131 and a capacitor 133, and a source connected to a bias circuit 135 and a non-inverting input terminal of an error amplifier 101 as a node Vref_ss. The error amplifier 101 has an inverting input terminal connected to an FB terminal 120, and an output connected to a non-inverting input terminal of a pulse width modulation (PWM) comparator 102. The PWM comparator 102 has an inverting input terminal connected to a triangular wave generator circuit 104, and an output connected to an input terminal of a buffer 107. The buffer 107 has an output terminal connected to an EXT terminal 121. An external N-channel field-effect transistor (FET) 114 has a gate connected to the EXT terminal 121, a drain connected to an inductor 112 and an anode of a diode 113, and a source connected to a ground 123. On the opposite side of the inductor 112, a power supply terminal 110 and a capacitor 111 are connected in parallel. The diode 113 has a cathode connected to a capacitor 115 and an output terminal 122. The output terminal 122 is connected in parallel to a resistor 117 and a capacitor 116. A resistor 118 is connected to the resistor 117, and a connection point between the resistor 118 and the resistor 117 is connected to the FB terminal 120.

When a power supply voltage is supplied between the power supply terminal 110 and the ground 123, a current flows from the bias circuit 131 so that charges are stored into the capacitor 133 to increase a gate voltage of the transistor 132 gradually. In this way, the transistor 132 gradually approaches an ON state, and the node Vref_ss gradually increases to a reference voltage. As the voltage of the non-inverting input terminal of the error amplifier 101 increases gradually, the output of the error amplifier 101 also increases gradually. Accordingly, the PWM comparator 102 compares the gradually-increasing output of the error amplifier 101 with an output of the triangular wave generator circuit 104, to thereby output a gradually-thickening duty pulse with respect to a thin duty pulse. The pulse is supplied to the gate of the external N-channel FET 114 via the buffer 107 to control an output voltage to increase gradually. Because the output voltage is controlled to increase gradually, an overshoot or an inrush current may be prevented from occurring (see, for example, Japanese Patent Application Laid-open No. 2005-51956).

In order to suppress an inrush current flowing into the FET, a soft start circuit is required to provide a soft start time of several milliseconds. The conventional circuit raises the node Vref_ss gradually, and hence the node needs to spend several milliseconds being raised. Therefore, on the condition that the output of the soft start circuit should be raised to a voltage Vref (for example, 0.6 V) after several milliseconds, a capacitance of approximately 100 pF is necessary when a current of the constant current circuit 131 is 20 nA.

In order to further prolong the soft start time, the capacitance needs to be increased. However, this is difficult to realize in terms of an increase in chip size. On the other hand, it is conceivable to reduce the constant current value to prolong the soft start time with the same capacitance. However, when the constant current value is set to a microcurrent of approximately 10 nA or smaller, an amount of a leakage current becomes non-negligible under high temperature, leading to a malfunction of the soft start circuit. For that reason, there is a limitation to prolong the soft start time by reducing the constant current value with the capacitance unvaried, avoiding the change in chip size. In terms of practical use, it is reasonable that the constant current value be approximately 20 nA and the capacitance be approximately 100 pF.

SUMMARY OF THE INVENTION

The present invention has been made in view of the above-mentioned problem, and has an object to provide a DC-DC converter including a soft start circuit capable of prolonging a soft start time without increasing a capacitance used in the soft start circuit.

In order to solve the above-mentioned problem, a DC-DC converter including a soft start circuit according to the present invention is configured as follows.

That is, the DC-DC converter includes: a soft start circuit; a pulse width modulation (PWM) comparator circuit; a reference voltage circuit; an error amplifier; a triangular wave generator circuit; and a buffer circuit, in which the soft start circuit includes: a constant current circuit; a first switch circuit; a second switch circuit; a first capacitor; and a second capacitor, the constant current circuit being connected to the first switch circuit, the first switch circuit having an output connected to the first capacitor and the second switch circuit, the second switch circuit having an output connected to the second capacitor, the first switch circuit being supplied with a first CLOCK signal, the second switch circuit being supplied with a second CLOCK signal.

According to the DC-DC converter including the soft start circuit of the present invention, a switched capacitor circuit is used in the soft start circuit to increase an output voltage gradually. Therefore, unlike the conventional example, the soft start time may be prolonged without increasing a capacitance inside the soft start circuit. In addition, without increasing a chip size, an overshoot of the output voltage may be eliminated and an inrush current may be prevented, to thereby achieve further improvement of characteristics.

DETAILED DESCRIPTION OF THE PREFERRED EMBODIMENTS

Now, referring to the accompanying drawings, embodiments of the present invention are described in detail.

Embodiments

Figure 1:
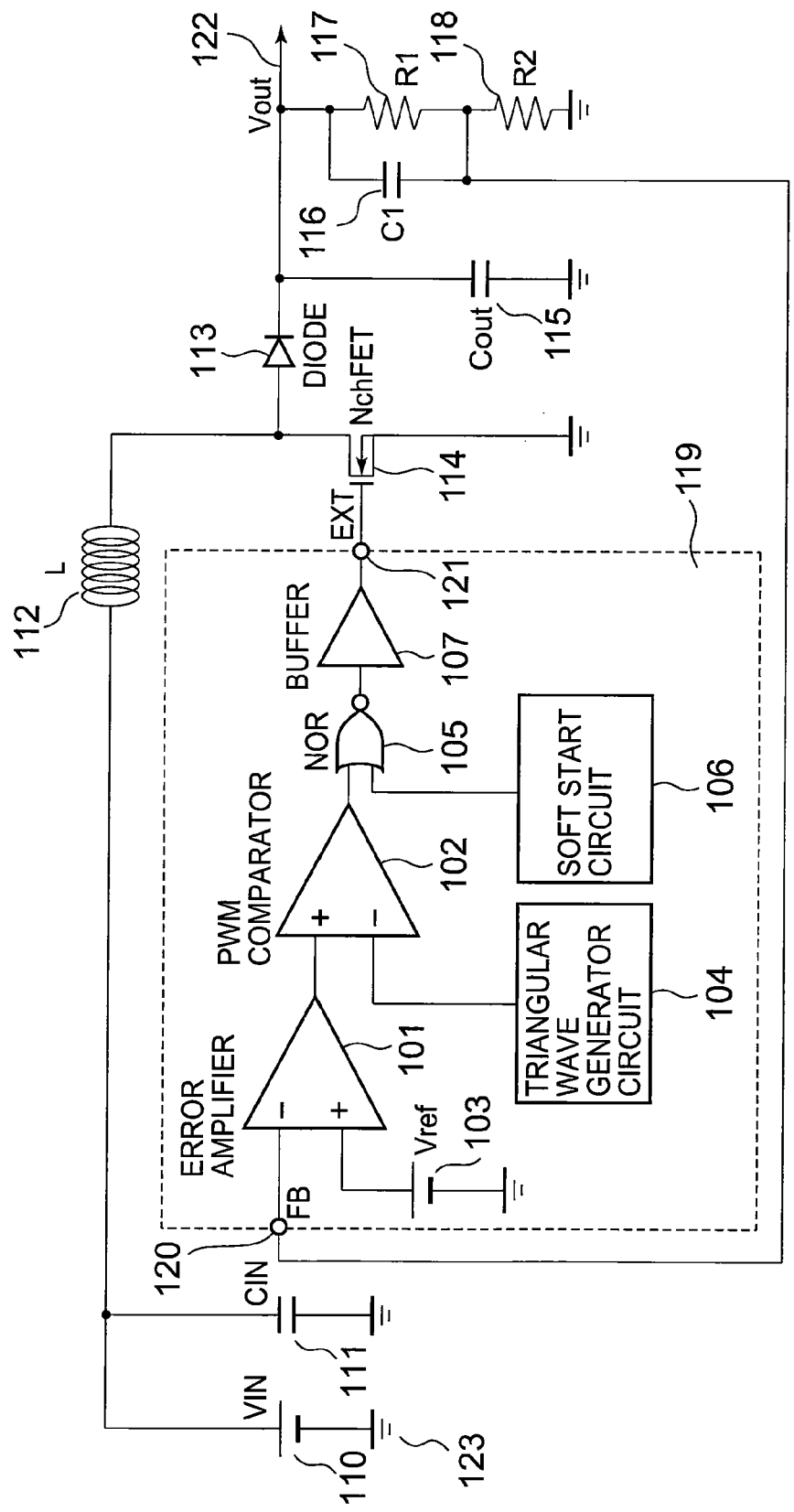
FIG. 1 is a circuit diagram of a DC-DC converter including a soft start circuit according to a first embodiment of the present invention.

FIG. 1 is a circuit diagram of a DC-DC converter according to a first embodiment of the present invention.

Figure 2:
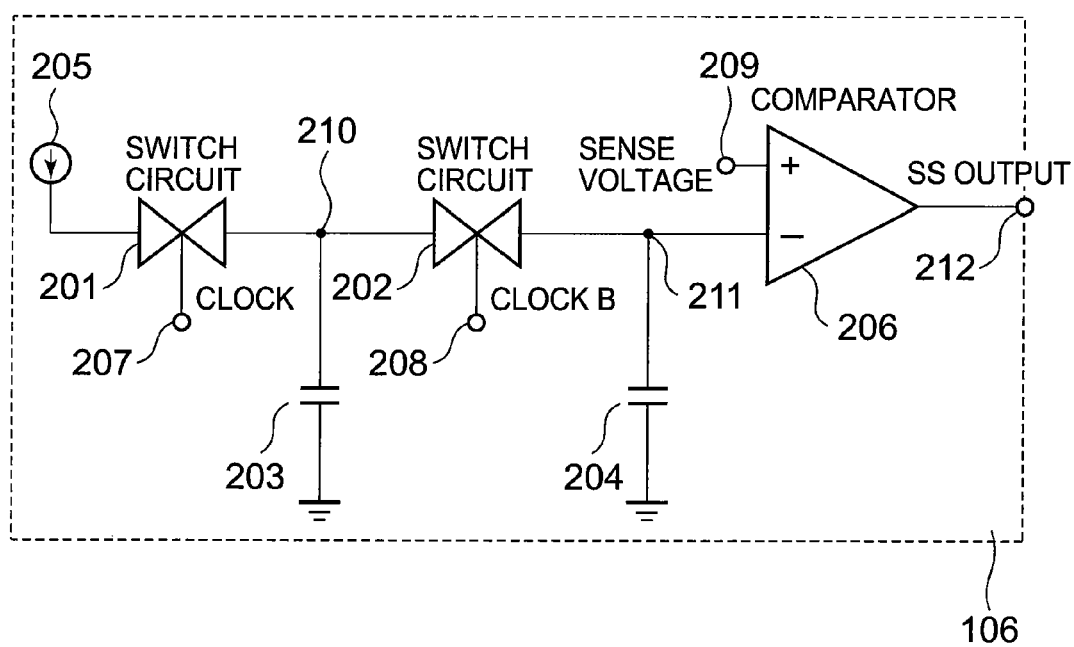
FIG. 2 is a detailed circuit diagram of the soft start circuit according to the first embodiment.

A DC-DC converter control circuit 119 according to this embodiment includes a pulse width modulation (PWM) comparator 102, a reference voltage circuit 103, an error amplifier 101, a triangular wave generator circuit 104, a NOR circuit 105, a soft start circuit 106, a buffer 107, an FB terminal 120, and an EXT terminal 121. As illustrated in FIG. 2, the soft start circuit 106 includes a constant current circuit (bias circuit) 205, switch circuits 201 and 202, capacitors 203 and 204, a comparator 206, a CLOCK terminal 207, a CLOCKB terminal 208, a sense voltage terminal 209, and an SS output terminal 212.

Next, connection of the component circuits included in the DC-DC converter control circuit 119, and external circuits are described.

The reference voltage circuit 103 is connected to a non-inverting input terminal of the error amplifier 101. The error amplifier 101 has an inverting input terminal connected to the FB terminal 120, and an output connected to a non-inverting input terminal of the PWM comparator 102. The PWM comparator 102 has an inverting input terminal connected to the triangular wave generator circuit 104, and an output connected to one input of the NOR circuit 105. The NOR circuit 105 has another input connected to the soft start circuit 106 as its input, and an output connected to an input terminal of the buffer 107. The buffer 107 has an output terminal connected to the EXT terminal 121. An N-channel field-effect transistor (FET) 114 has a gate connected to the EXT terminal 121, a drain connected to an inductor 112 and an anode of a diode 113, and a source connected to a ground 123. On the opposite side of the inductor 112, a power source terminal 110 and an input capacitor 111 are connected in parallel. The diode 113 has a cathode connected to a capacitor 115 (Cout) and an output terminal 122. The output terminal 122 is connected in parallel to a resistor 117 and a capacitor 116. A resistor 118 is connected to the resistor 117, and a connection point between the resistor 118 and the resistor 117 is connected to the FB terminal 120.

Connection in the soft start circuit 106 is described. The switch circuit 201 has an input terminal connected to the bias circuit 205, and an output terminal connected to the capacitor 203 and an input terminal of the switch circuit 202. The switch circuit 202 has an output connected to the capacitor 204 and an inverting input terminal of the comparator 206. The comparator 206 has a non-inverting input terminal connected to a sense voltage (not shown) obtained by converting an inductor current into a voltage. The comparator 206 has an output connected to the another input of the NOR circuit 105.

Figure 3:
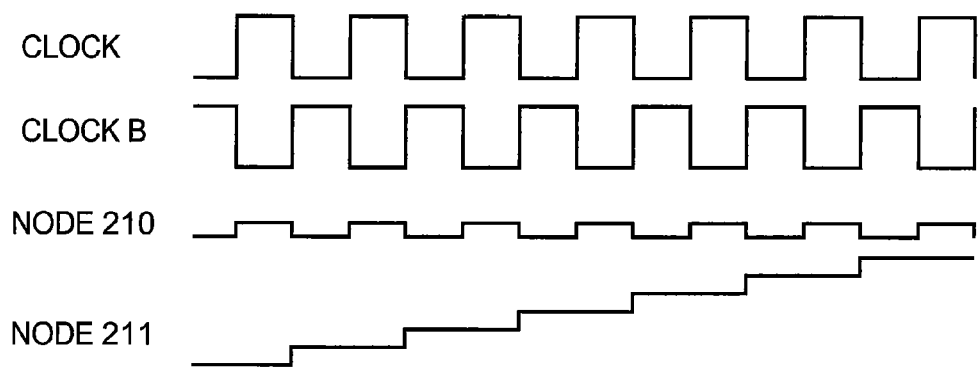
FIG. 3 is a diagram illustrating an operation of the soft start circuit according to the first embodiment.

Next, an operation of the soft start circuit 106 is described. FIG. 3 illustrates a timing chart of the soft start circuit 106. As illustrated in FIG. 3, after power-on, the CLOCK terminal 207 is supplied with a rectangular wave signal. Although not illustrated, the rectangular wave signal is produced by dividing a frequency of a rectangular wave signal generated in the triangular wave generator circuit 104. Then, the CLOCKB terminal 208 is supplied with a signal obtained by inverting the signal of the CLOCK terminal 207. When the CLOCK terminal 207 is supplied with the signal of Hi, the switch circuit 201 is turned ON. Then, the constant current circuit 205 allows a current to flow into the capacitor 203 so that charges are stored therein to increase a potential of a node 210. When the level of the CLOCK terminal 207 is subsequently changed to Lo, the CLOCKB terminal 208 becomes Hi to turn ON the switch circuit 202. Then, the charges are transferred from the capacitor 203 to the capacitor 204 to increase a potential of a node 211. In response to the subsequent signal switching where the CLOCK terminal 207 is supplied with the signal of Hi while the CLOCKB terminal 208 is supplied with the signal of Lo, the switch circuit 201 is turned ON and the switch circuit 202 is turned OFF. Then, the current flows from the constant current circuit 205 into the capacitor 203 so that the charges are stored therein to increase the potential of the node 210. Subsequently, when the signals are switched again so that the CLOCK terminal 207 is supplied with the signal of Lo while the CLOCKB terminal 208 is supplied with the signal of Hi, the switch circuit 201 is turned OFF and the switch circuit 202 is turned ON. Then, the charges are transferred from the capacitor 203 to the capacitor 204 to increase the potential of the node 211 to a higher level. In this way, the potential of the node 211 increases gradually.

After the power-on, an inrush current flows into the inductor 112, and accordingly the sense voltage increases abruptly. On this occasion, the node 211 has a voltage value smaller than that of the sense voltage, and hence the comparator 206 outputs Hi. Then, the NOR circuit 105 outputs Lo, and the buffer 107 outputs Lo. Accordingly, the EXT terminal 121 becomes Lo to turn OFF the N-channel FET 114. Because the N-channel FET 114 is turned OFF, the inrush current is limited. Because the inrush current is limited, the sense voltage decreases. Then, when the sense voltage decreases to be lower than the voltage of the node 211, the comparator 206 outputs Lo. This output stops the operation of turning OFF the N-channel FET 114, and therefore the output voltage increases based on the signal from the PWM comparator 102. When the output voltage increases abruptly, the inrush current flows again to increase the sense voltage. The voltage of the node 211 on this occasion is higher than the previous one because the voltage of the node 211 is increasing gradually. Accordingly, the comparator 206 is inverted with the sense voltage higher than the previous one to output Hi. When the comparator 206 outputs Hi, the comparator 206 operates so as to limit the inrush current again. Repeating the operation described above, the voltage of the node 211 increases gradually, and the comparator 206 is inverted with the gradually-increasing sense voltage. By inverting the comparator 206 with the gradually-increasing sense voltage as described above, the voltage Vout of the output terminal 122 increases gradually.

A soft start time may be adjusted by varying respective capacitances of the capacitors 203 and 204. Because the charges stored in the capacitor 203 are all transferred to the capacitor 204, the capacitor 204 is generally set to have a larger capacitance than that of the capacitor 203. In order to prolong the soft start time with this configuration, the capacitance of the capacitor 204 needs to be increased to prolong the soft start time. However, as the capacitance becomes larger, a chip size becomes larger. For that reason, as described above, the time period for the voltage of the node 211 to increase gradually is adjusted by varying the frequency of the signals supplied to the CLOCK terminal 207 and the CLOCKB terminal 208. In this way, the time period for the voltage of the node 211 to increase may be adjusted without increasing the capacitance of the capacitor 204. In other words, the soft start time may be adjusted by varying the frequency of the signals supplied to the CLOCK terminal 207 and the CLOCKB terminal 208. In this way, the soft start time may be prolonged without increasing the chip size because the capacitance does not need to be increased.

Figure 4:
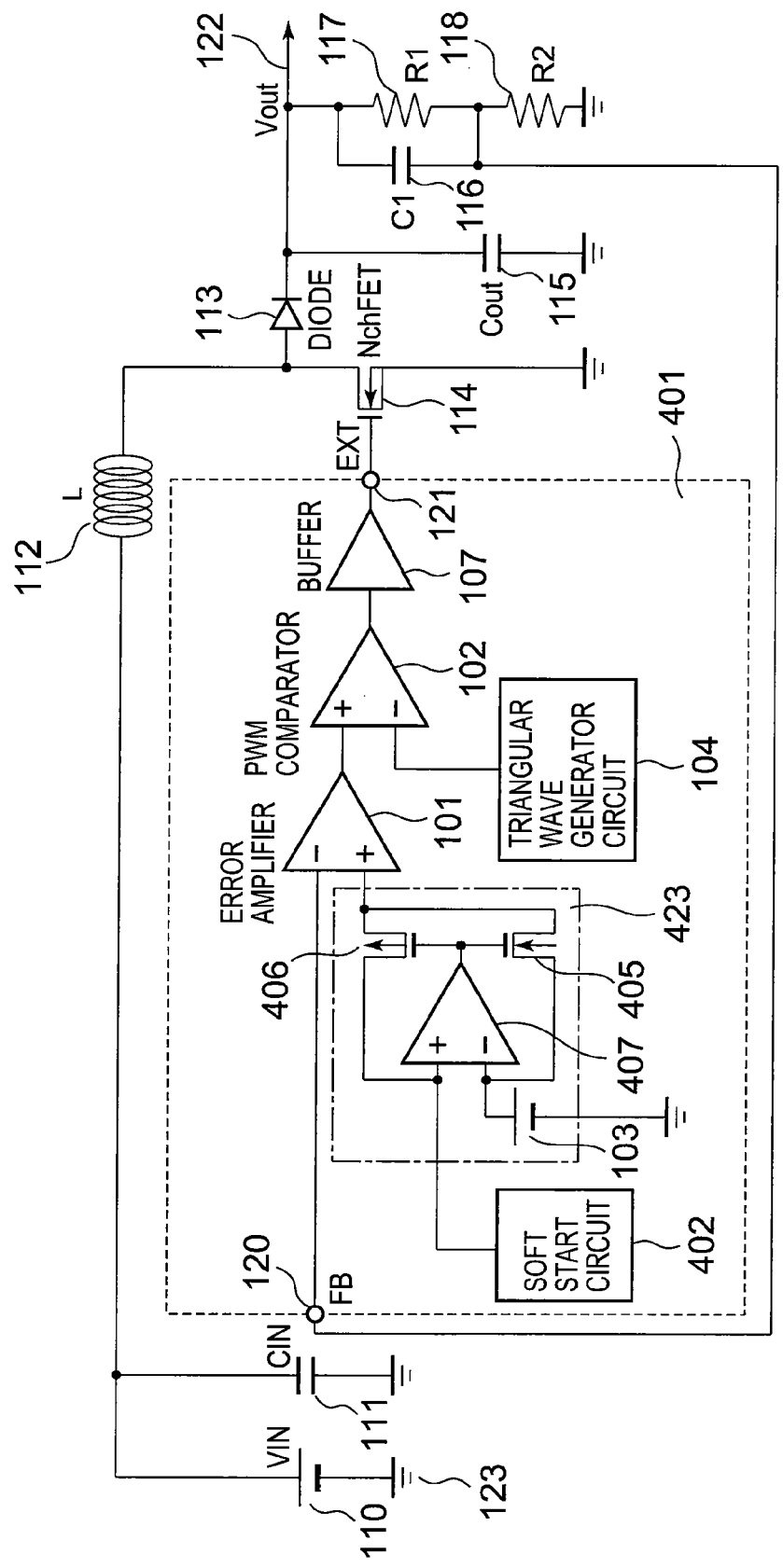
FIG. 4 is a circuit diagram of a DC-DC converter including a soft start circuit according to a second embodiment of the present invention.
Figure 5:
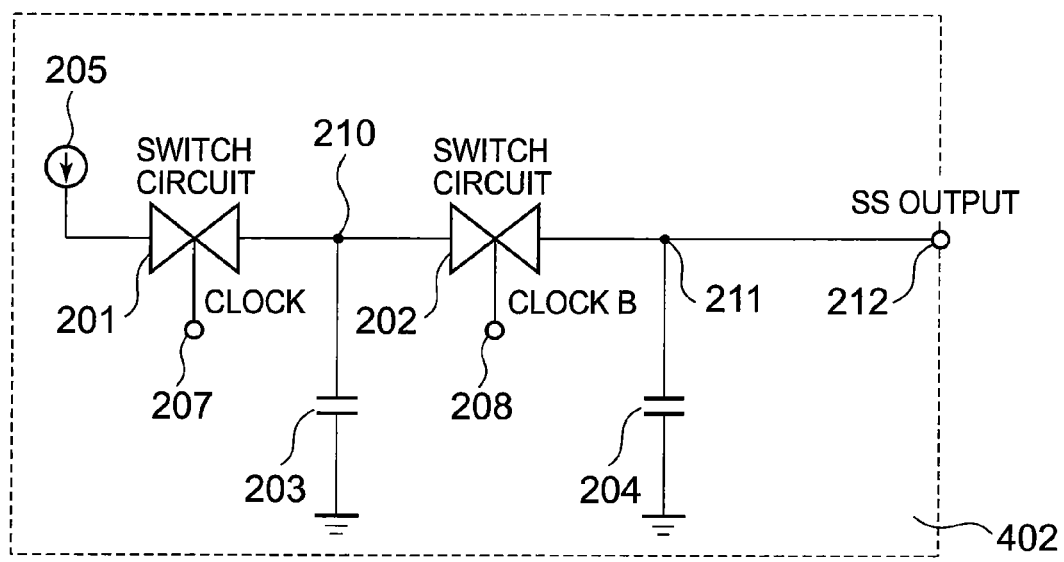
FIG. 5 is a detailed circuit diagram of the soft start circuit according to the second embodiment.
Figure 6:
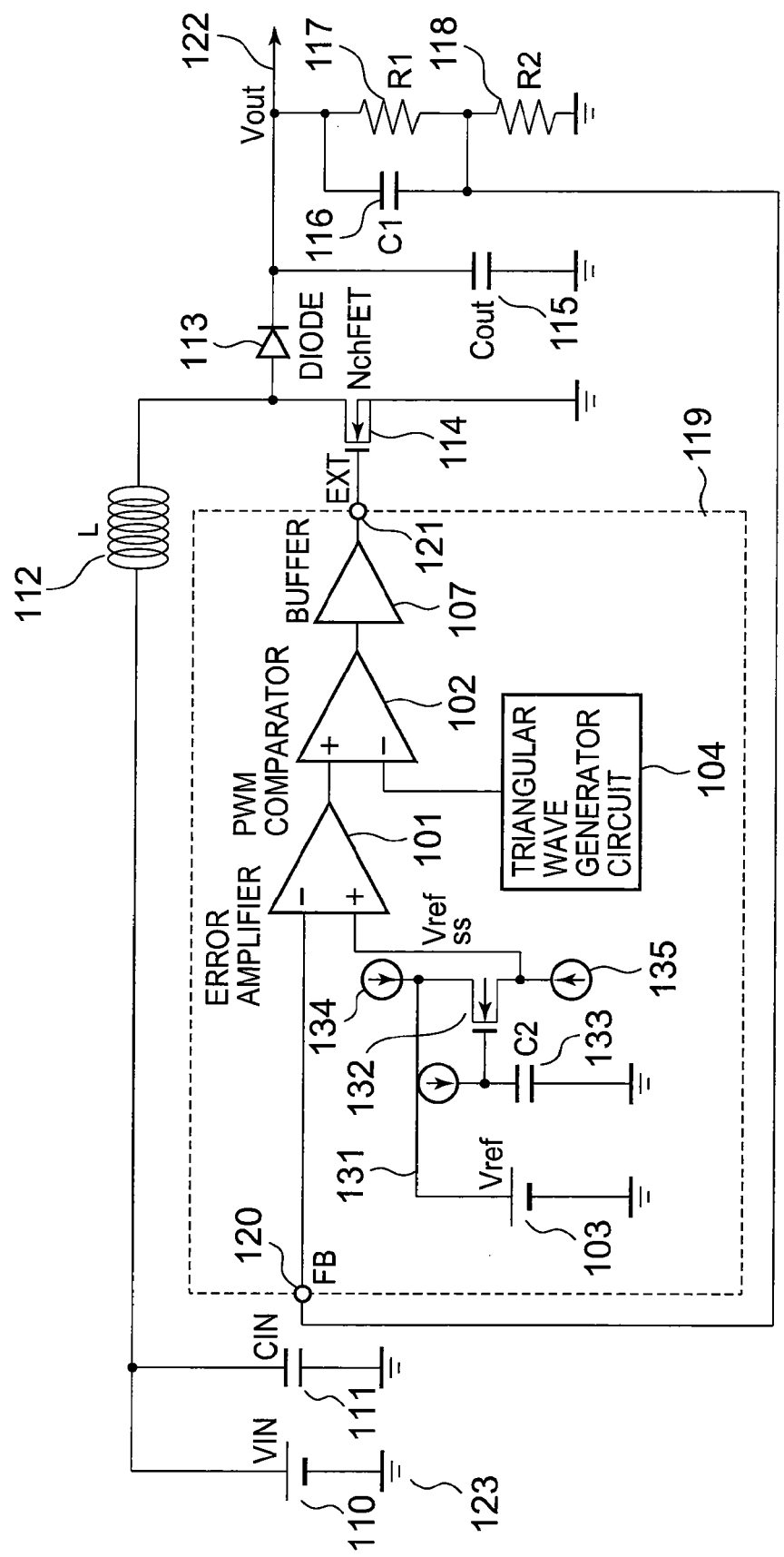
FIG. 6 is a circuit diagram of a conventional DC-DC converter including a soft start circuit.

FIG. 4 is a circuit diagram of a DC-DC converter according to a second embodiment of the present invention. A DC-DC converter control circuit 401 according to this embodiment includes the PWM comparator 102, a reference voltage circuit section 423, the error amplifier 101, the triangular wave generator circuit 104, a soft start circuit 402, the buffer 107, the FB terminal 120, and the EXT terminal 121. The reference voltage circuit section 423 includes a comparator 407, an N-channel transistor 405, a P-channel transistor 406, and the reference voltage circuit 103. As illustrated in FIG. 5, the soft start circuit 402 has a configuration obtained by eliminating the comparator 206 and the sense voltage terminal 209 from the circuit illustrated in FIG. 2.

Connection of the component circuits included in the DC-DC converter control circuit 401, and external circuits are described.

The reference voltage circuit section 423 has an output connected to the non-inverting input terminal of the error amplifier 101. The error amplifier 101 has the inverting input terminal connected to the FB terminal 120, and the output connected to the non-inverting input terminal of the PWM comparator 102. The PWM comparator 102 has the inverting input terminal connected to the triangular wave generator circuit 104, and the output connected to the input terminal of the buffer 107. The buffer 107 has the output terminal connected to the EXT terminal 121. The N-channel FET 114 has the gate connected to the EXT terminal 121, the drain connected to the inductor 112 and the anode of the diode 113, and the source connected to the ground 123. On the opposite side of the inductor 112, the power supply terminal 110 and the input capacitor 111 are connected in parallel. The diode 113 has the cathode connected to the capacitor 115 and the output terminal 122. The output terminal 122 is connected in parallel to the resistor 117 and the capacitor 116. The resistor 118 is connected to the resistor 117, and the connection point between the resistor 118 and the resistor 117 is connected to the FB terminal 120.

In the reference voltage circuit section 423, the comparator 407 has an inverting input terminal connected to the reference voltage circuit 103 and a source of the N-channel transistor 405, and a non-inverting input terminal connected to an output of the soft start circuit 402 and a source of the P-channel transistor 406. The comparator 407 has an output connected to a gate of the N-channel transistor 405 and a gate of the P-channel transistor 406. The N-channel transistor 405 has a drain connected to the output of the reference voltage circuit section 423. The P-channel transistor 406 has a drain connected to the output of the reference voltage circuit section 423.

Similarly to the first embodiment, the soft start circuit 402 described above has the function of gradually increasing the voltage of the node 211. Accordingly, the output of the soft start circuit 402 increases gradually. When power is turned on, the output of the soft start circuit 402 is lower than that of the reference voltage circuit 103, and hence the comparator 407 outputs a signal of Lo. Then, the P-channel transistor 406 is turned ON while the N-channel transistor 405 is turned OFF, and accordingly the reference voltage circuit section 423 outputs the output voltage of the soft start circuit 402. When the output of the soft start circuit 402 gradually increases to be higher than the voltage of the reference voltage circuit 103, the output of the comparator 407 is switched from Lo to Hi. Then, the P-channel transistor 406 is turned OFF while the N-channel transistor 405 is turned ON, and accordingly the reference voltage circuit section 423 outputs the voltage of the reference voltage circuit 103. The output voltage of the reference voltage circuit section 423 is connected to the non-inverting input terminal of the error amplifier 101, and hence after the power-on, as the voltage of the non-inverting input terminal of the error amplifier 101 increases gradually, the output of the error amplifier 101 also increases gradually. Then, the PWM comparator 102 compares the gradually-increasing output of the error amplifier 101 with the output of the triangular wave generator circuit 104, to thereby output a gradually-thickening duty pulse with respect to a thin duty pulse. The pulse is supplied to the gate of the N-channel FET 114 via the buffer 107 to control the output voltage to increase gradually. In this way, the soft start may be implemented.

The time period for the voltage of the node 211 of the soft start circuit 402 to increase gradually, that is, the soft start time may be adjusted by varying a frequency of the signals supplied to the CLOCK terminal 207 and the CLOCKB terminal 208. Therefore, the soft start time may be prolonged without varying the sizes of the capacitors 203 and 204. In this way, the soft start time may be prolonged without increasing the chip size because the capacitance does not need to be increased.

As described above, according to the soft start circuits included in the DC-DC converters of the embodiments, the soft start time may be varied by varying the frequency of the signals supplied to the CLOCK terminal 207 and the CLOCKB terminal 208. Therefore, the present invention produces the effect that the soft start time may be prolonged without increasing the capacitance, that is, without increasing the chip size.

The invention claimed is:

1. A DC-DC converter, comprising:
a soft start circuit;
a pulse width modulation (PWM) comparator circuit;
a reference voltage circuit;
an error amplifier;
a triangular wave generator circuit;
a buffer circuit; and
a NOR circuit,
wherein the soft start circuit comprises:
  a bias circuit;
  a first switch circuit;
  a second switch circuit;
  a first capacitor;
  a second capacitor, and
  a second comparator,
  the bias circuit connected to the first switch circuit, the first switch circuit having an output connected to the first capacitor and the second switch circuit, the second switch circuit having an output connected to the second capacitor, the first switch circuit supplied with a first CLOCK signal, the second switch circuit supplied with a second CLOCK signal,
wherein the second comparator is supplied with an output of the soft start circuit at an inverting input terminal thereof, and supplied with a sense voltage at a non-inverting input terminal thereof, and has an output connected to one input of the NOR circuit, and the PWM comparator circuit has an output connected to another input of the NOR circuit.

2. A DC-DC converter according to claim 1, wherein the soft start circuit varies a soft start time by inversely varying a voltage level of the first CLOCK signal of the first switch circuit with respect to the second CLOCK signal of the second switch circuit.

3. A DC-DC converter according to claim 1, further comprising:
a third comparator;
a P-channel transistor; and
an N-channel transistor,
wherein the soft start circuit has an output connected to a non-inverting input terminal of the third comparator and a source of the P-channel transistor,
wherein the reference voltage circuit has an output connected to an inverting input terminal of the third comparator and a source of the N-channel transistor,
wherein the third comparator has an output connected to a gate of the P-channel transistor and a gate of the N-channel transistor,
wherein the error amplifier has a non-inverting input terminal connected to a drain of the P-channel transistor and a drain of the N-channel transistor, and
wherein the reference voltage circuit has a reference voltage having a gradually-increasing voltage value.

4. A DC-DC converter, comprising:
a soft start circuit;
a pulse width modulation (PWM) comparator circuit;
a reference voltage circuit;
an error amplifier;
a triangular wave generator circuit;
a buffer circuit;
a second comparator;
a P-channel transistor; and
an N-channel transistor,
wherein the soft start circuit comprises:
a bias circuit;
a first switch circuit;
a second switch circuit;
a first capacitor;
a second capacitor;
the bias circuit connected to the first switch circuit, the first switch circuit having an output connected to the first capacitor and the second switch circuit, the second switch circuit having an output connected to the second capacitor, the first switch circuit supplied with a first CLOCK signal, the second switch circuit supplied with a second CLOCK signal;
wherein the soft start circuit has an output connected to a non-inverting input terminal of the second comparator and a source of the P-channel transistor,
wherein the reference voltage circuit has an output connected to an inverting input terminal of the second comparator and to a source of the N-channel transistor,
wherein the second comparator has an output connected to a gate of the P-channel transistor and to a gate of the N-channel transistor, and
wherein the error amplifier has a non-inverting input terminal connected to a drain of the P-channel transistor and to a drain of the N-channel transistor.

* * * * *